United States Patent

Scharlack

[15] 3,663,070
[45] May 16, 1972

[54] SKID CONTROL SYSTEM

[72] Inventor: Ronald S. Scharlack, San Antonio, Tex.

[73] Assignee: Kelsey-Hayes Company, Romulus, Mich.

[22] Filed: Nov. 10, 1969

[21] Appl. No.: 875,412

[52] U.S. Cl. ............................................. 303/21 P, 303/20
[51] Int. Cl. ................................................. B60t 8/12
[58] Field of Search .............. 303/21 AF, 21 B, 21 BB, 21 F, 303/20, 21 BE, 21 P; 188/181 A, 181 C, 181 T; 324/162; 340/262

[56] References Cited

UNITED STATES PATENTS

| | | | |
|---|---|---|---|
| 3,362,757 | 1/1968 | Marcheron | 303/21 P |
| 3,467,443 | 9/1969 | Okamoto et al. | 303/21 EB |
| 3,467,444 | 9/1969 | Leiber | 303/21 BE |
| 3,495,882 | 2/1970 | Stelzer | 303/21 F |

*Primary Examiner*—Milton Buchler
*Assistant Examiner*—Stephen G. Kunin
*Attorney*—Harness, Dickey & Pierce

[57] ABSTRACT

A control system and force motor assembly for controlling the skidding of a vehicle under braked conditions when the control system provides a signal for controlling the position of an armature or fluid pressure controlling device in one of three conditions; the first condition being the "dump" mode of operation when the force motor is controlled to preclude braking pressure from being supplied to the wheels of the vehicle, the "hold" mode of operation when the braking force presented at the time the system goes into the "hold" mode of operation is maintained, and the "return" mode of operation when full applied braking pressure is returned to the vehicle wheels.

The control system is effectively responsive to a critical slip signal, the signal being generated in response to a sensed difference between a hypothetical vehicle deceleration, as approximated by a decreasing ramp signal, and the vehicle wheel speed. This comparison is made on a differential basis to provide an output signal which is utilized in controlling an output gate. The gate is also responsive to the sensing of a positive wheel acceleration signal and a change in sign of the rate of change of wheel acceleration. The signal from the output gate is fed to an output logic circuit, the output logic circuit also being rendered responsive to the first derivative of the wheel velocity signal and a combination of first and second derivative of the wheel velocity signal.

The output signals are utilized in the output logic circuit to generate one of three signal conditions across the solenoid coil of the force motor actuator assembly. In the return mode of operation, the polarity of the output signals generated across the solenoid coil are of the same polarity to cause zero current to flow through the solenoid coil. In the dump mode of operation, the coil is provided with current flow in a first direction and in the hold mode of operation the solenoid coil is supplied with current flowing in a second direction opposite to the first direction. The force motor is fabricated with a three positioned armature which is adapted to be placed either in the return or deactuated position, where no signals are provided from the control circuit; a dump mode of operation which connects the manually actuated brake cylinder hydraulically to the wheel cylinders to provide full braking pressure; and the hold position which maintains the pressure being fed to the wheels at the time the hold position is achieved.

13 Claims, 4 Drawing Figures

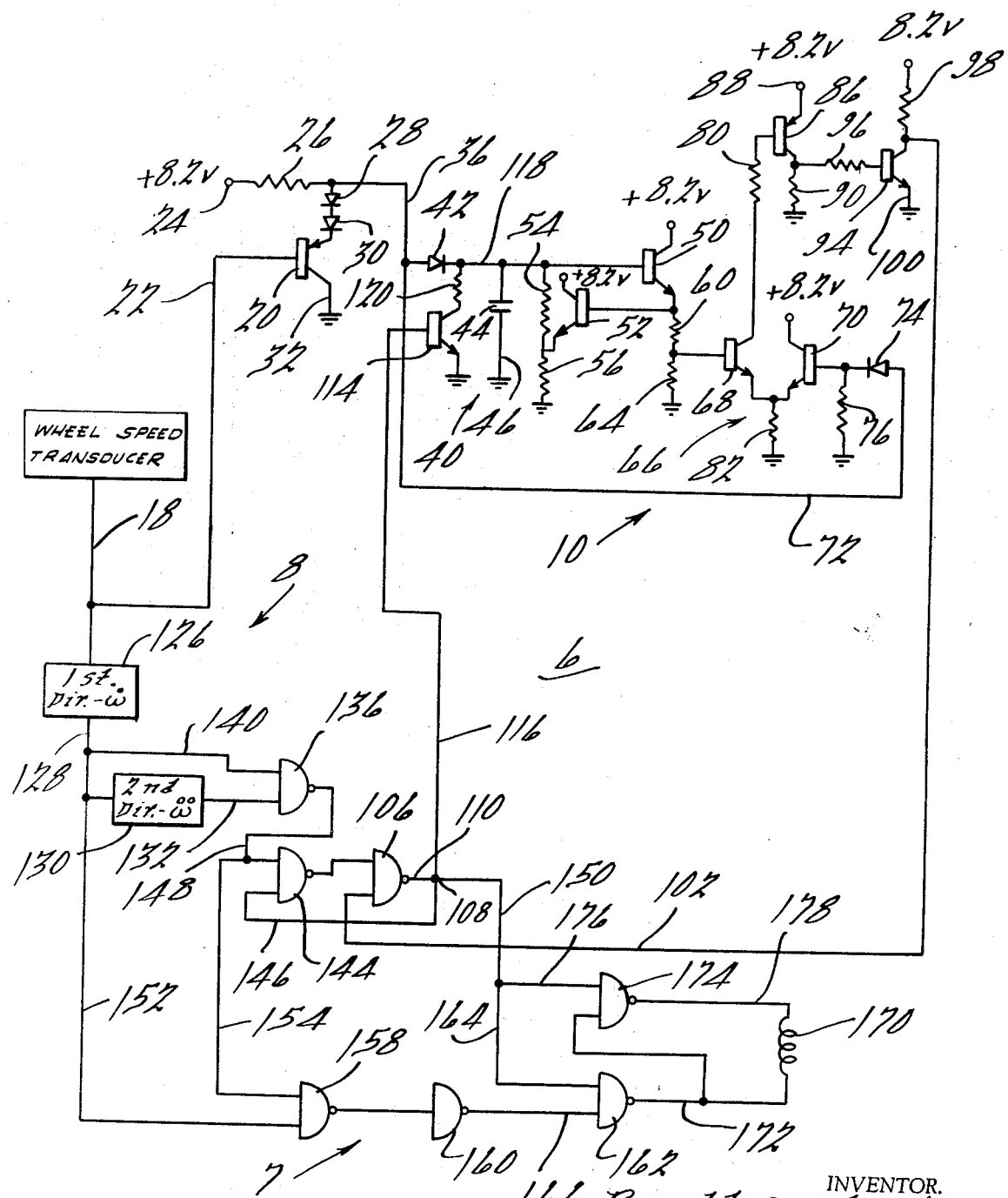

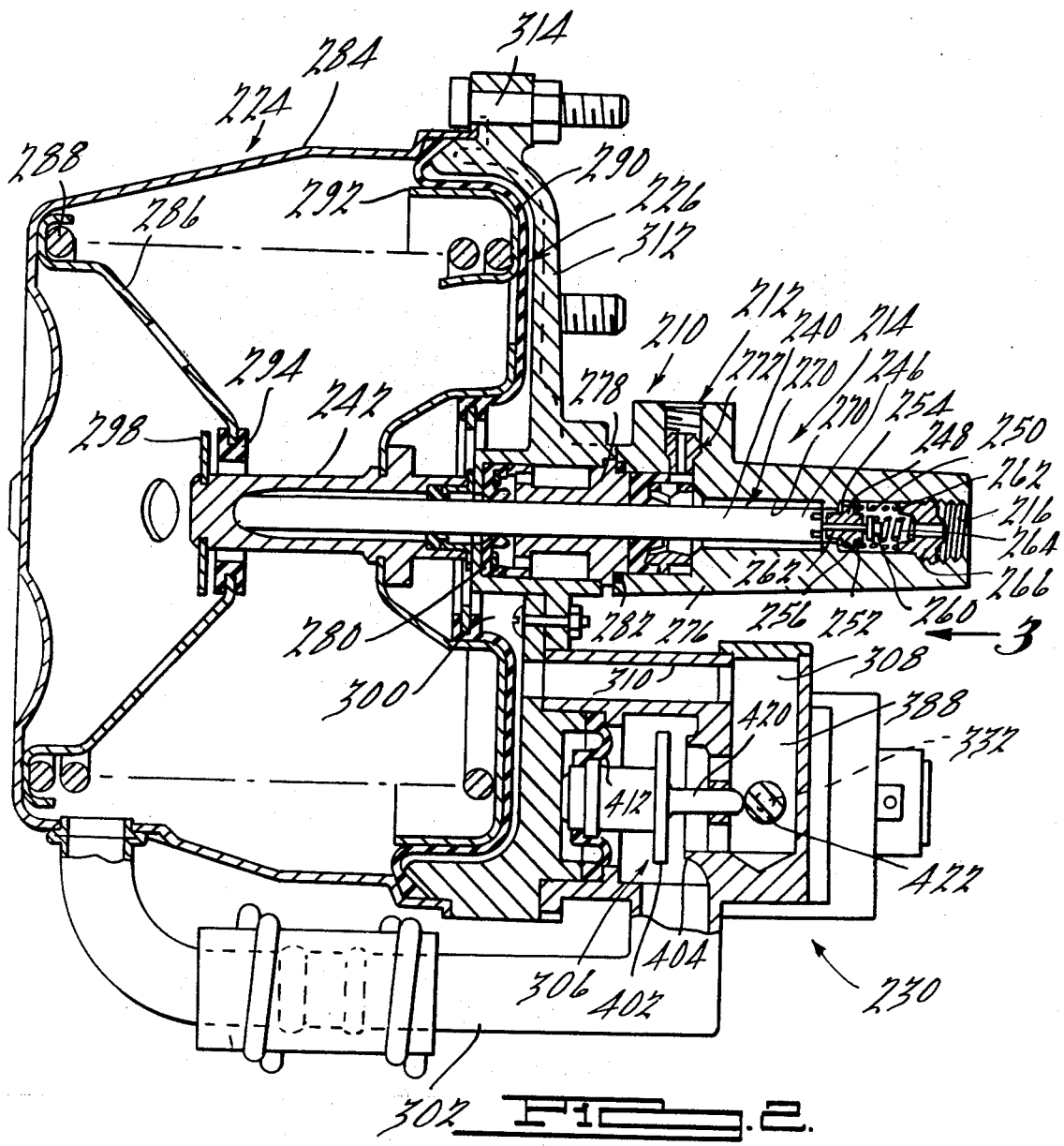

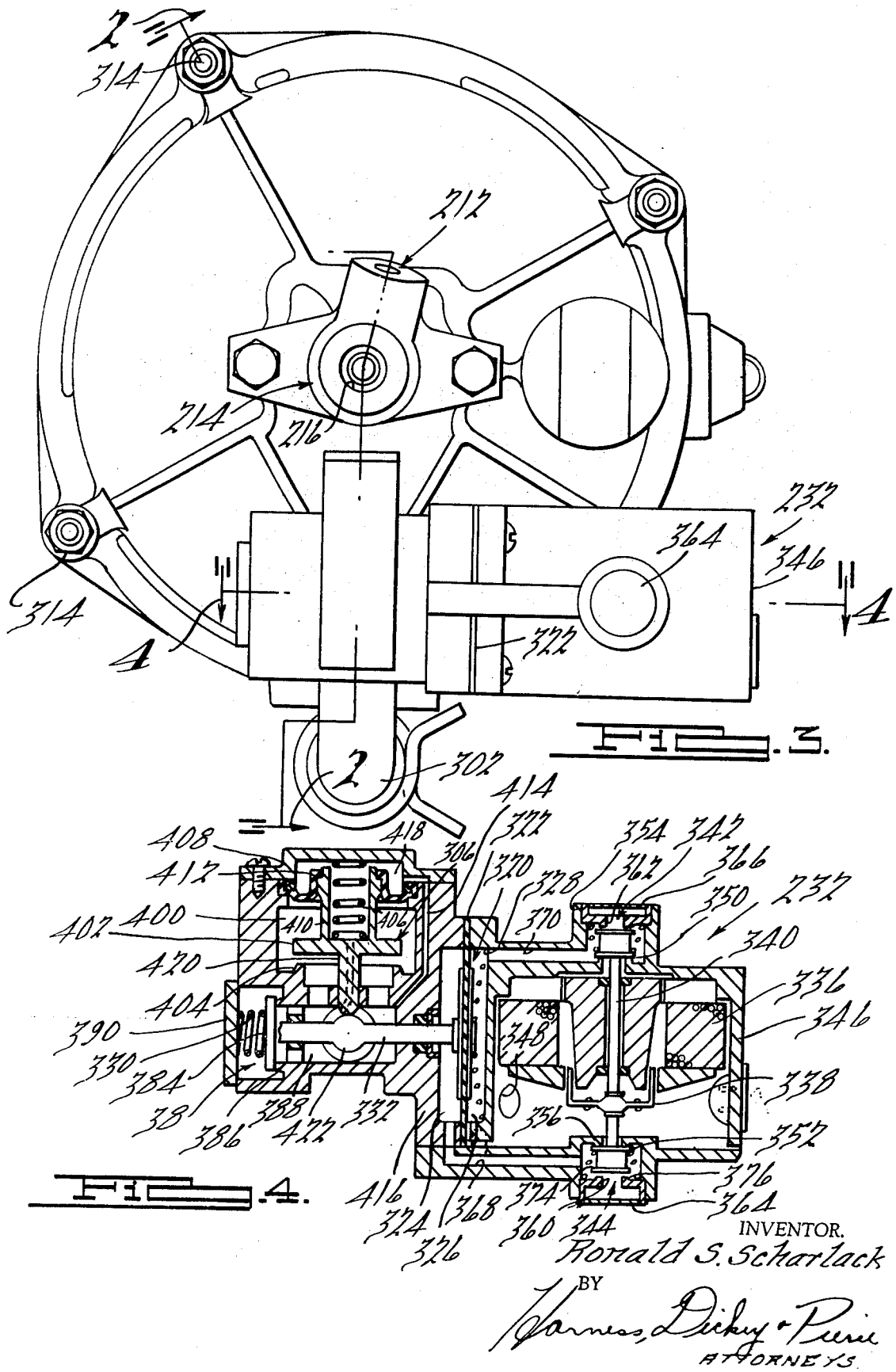

SKID CONTROL SYSTEM

BACKGROUND AND SUMMARY OF THE DEVELOPMENT

This invention relates generally to vehicle braking systems and, more particularly, to a brake control system for preventing wheel skidding and minimizing stopping distances while maintaining directional stability through a system which senses, on the run-down portion of the cycle, a critical slip signal and, on a spinup side of the cycle, a positive wheel acceleration and a change in the sign of the rate of change of the wheel acceleration signal to produce one of three output signal conditions, i.e., a zero current signal condition, a first polarity or direction of current flow condition and a second polarity or flow of current direction signal, to control the position of the armature of a force motor connected in pressure controlling relation with a wheeled vehicle braking system.

For purposes of describing the system of the present invention, the term "slip" refers to a characteristic of the rotating element whereby the element rotates at less than its free rolling speed when a braking force or torque is applied. In the context of the system, this slip may be approximated by a hypothetical measure of the vehicle speed in comparing this vehicle speed to a wheel speed. The term "skid" or "slide" refers to a locked wheel condition.

One of the major difficulties which arises in a braking and moving vehicle, such as an automobile, an aircraft or other wheeled vehicle, occurs when the braking wheel, or wheels, skid or slide, this skid tending to create an unstable condition in the controlled motion of the vehicle. Wheel lockup may cause such a loss in directional stability as to result in an uncontrolled skidding or sliding while at the same time the presence of the locked wheels generally increases the distance required to stop due to the reduced coefficient of friction while skidding.

Several skid control systems have been devised which are effective under various road conditions to minimize stopping distance while maximizing the directional stability of the vehicle. One such system as disclosed in copending application of Ronald S. Scharlack, Ser. No. 854,876, filing date Sept. 3, 1969, and executed on Aug. 28, 1969, discloses a critical slip sensing system and a logic circuit to detect when the system is in a critical slip or when a positive wheel acceleration signal exists in conjunction with a change in sign of the rate of change of wheel acceleration from a positive to a negative value.

This latter system is utilized, in conjunction with additional logic circuitry, to provide a three mode control signal which is utilized to control the force motor, and the armature associated therewith, in three modes of operation, i.e., the dump, hold and return modes of operation.

It has been discovered that a braking system may be used most efficiently if, upon sensing of the acceleration or spinup of the wheel, the brake pressure be held at the particular value achieved at the start of the spinup of the wheels rather than dropping the brake pressure down to a further point. Since the wheel is already starting the spinup portion of the cycle, it is not necessary to further dump brake pressure. It is the purpose of the present system to hold the brake pressure at the particular value at which spinup will occur and reapply brake pressure upon the sensing of the inflection point on the spinup side of the cycle. At this inflection point, brake pressure is again applied (the return mode of operation) to cause the wheel to decrease its rate of change of acceleration and finally achieve the run-down or deceleration portion of the cycle. Prior to the achieving of the critical slip point, the brake pressure is returned to the wheels at a preselected rate of return.

For purposes of this discussion, the portion of the cycle between the application of brake pressure initially and the sensing of the critical slip point will be referred to as the preskid portion of the cycle. The portion of the cycle between the critical slip point and the start of the spinup of the wheels will be called the skid portion of the cycle. The portion of the cycle between the start of spinup and the sensing of the inflection point at which the rate of change of acceleration curve changes sign will be called the acceleration mode of operation. The final portion of the cycle between the inflection point and the top of the spinup portion of the cycle will be called the post inflection portion, and the system achieves the preskid portion after the post inflection portion of the cycle.

Accordingly, it is one object of the present invention to provide an improved system for operating the brakes of a wheeled vehicle.

It is another object of the present invention to provide an improved skid control system for the brake or brakes of a wheeled vehicle.

It is still a further object of the present invention to provide an improved brake control system of the type described which is capable of eliminating skidding or sliding of the braked wheel including a provision for holding the brake pressure during a predetermined portion of the wheel velocity cycle.

It is still another object of the present invention to provide an improved triple mode skid control system which includes an improved skid sensing system.

It is still a further object of the present invention to provide an improved skid control system incorporating an improved logic circuit.

It is still a further object of the present invention to provide an improved skid control system which incorporates a circuit for generating a critical slip signal.

It is still a further object of the present invention to provide an improved triple mode skid control system which generates a critical slip signal in response to a function of the wheel speed and hypothetical vehicle speed signal.

It is still a further object of the present invention to provide an improved skid control system incorporating a triple mode valve.

It is still another object of the present invention to provide an improved skid control system incorporating three modes of operation, i.e., a dump, hold and return mode of operation.

It is still another object of the present invention to provide an improved logic control system for use in connection with a skid control system which incorporates the first and second derivative of the wheel speed signal and also a critical slip signal to control the operation of a triple mode valve.

It is still a further object of the present invention to provide an improved skid control system which is reliable in use, inexpensive to manufacture and easily installed.

Further objects, features and advantages of this invention will become apparent from a consideration of the following description, the appended claims and the accompanying drawings in which:

FIG. 1 is a schematic diagram illustrating the features of a novel skid control system of the present invention;

FIG. 2 is a cross-sectional view of a preferred form of triple mode force motor and control valve for use in connection with the circuit of FIG. 1 as taken along line 2—2 of FIG. 3;

FIG. 3 is an end view of the force motor and valve assemblies of FIG. 2; and

FIG. 4 is a cross-sectional view of FIG. 3 taken along line 4—4 thereof.

The skid control system of the present invention is particularly adapted to be utilized and will be described specifically for use with an automotive vehicle. However, as we understand, the features of the invention may be utilized with other types of vehicles, including aircraft and other wheeled vehicles, which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring particularly to FIG. 1, there is schematically illustrated a control system 6 which includes an output circuit 7 to generate a signal across an output coil, the coil forming part of a solenoid assembly for a force motor to be described in conjunction with FIGS. 2 and 4. As stated above, the signal across the coil takes one of three forms, either current flowing through the coil in a first direction, current flowing through the coil in a second direction opposite to the first direction or zero current. This output signal is generated in accordance with the particular portion of the wheel velocity signal being sensed during the braking cycle of the wheel. This wheel velocity is sensed by means of an angular velocity transducer and a logic circuit 8, the latter of which is responsive to both the first and second derivative of the wheel angular velocity and also to a critical wheel slip signal which is generated by means of a critical slip circuit 10.

Referring particularly to the critical slip circuit 10, the circuit is utilized to control the release of the brakes on the rundown portion of the stopping cycle, and the wheel acceleration and rate of change of wheel acceleration signal generating circuit 8 is utilized in reapplying the brakes. Particularly, the circuit 10 includes an input from the wheel velocity sensing transducer which provides a velocity input signal omega ($\omega$) to an input conductor 18. This signal is fed to an input amplifier transistor 20, and particularly to the base electrode thereof, by means of a conductor 22. The emitter-collector circuit of the transistor 20 is connected to a positive source of d.c. potential at terminal 24 through a resistor 26 and a pair of diodes 28 and 30 and the collector electrode is grounded at 32.

The transistor 20 is biased such that the entire wheel velocity signal, as illustrated in FIG. 2 of the aforementioned copending application, Ser. No. 854,876, is transmitted through the output conductor 36 connected to the junction between the upper diode 28 and the resistor 26. The diagram of the aforementioned copending application illustrates a portion, and particularly one cycle, of the wheel velocity signal as impressed on conductor 36. The wave form is seen to be a damped oscillatory wave which is generally schemetrical about a decreasing straight line having a negative slope. The wheel velocity wave form impressed on conductor 36 is fed to a vehicle ramp speed generating circuit 40. The circuit 40 generates a ramp voltage which nearly approximates the actual vehicle speed. This ramp voltage may be selected to be of any configuration desired and, in a particular illustrated embodiment, the ramp is chosen to be one unity of gravity deceleration rate of the vehicle.

Particularly, the signal on conductor 36 is fed through a diode 42 to a capacitor 44, the opposite plate of the capacitor being grounded at 46. Thus, as long as the voltage on conductor 36 exceeds the voltage on capacitor 44, the current will be fed to the capacitor 44. In this way, the capacitor is initially charged to a voltage which is representative of the unbraked wheel speed.

For purposes of this discussion, wheel velocity will be considered to be a damped oscillatory wave which oscillates about a relatively straight line having a negative slope, as described above. Further, the portions of a single cycle of the wheel velocity wave will be referred to as described above, i.e., the preskid portion, the skid portion, the acceleration portion, and the post inflection portion. These portions of the cycle have been described in the preamble of this specification.

Accordingly, it is seen that the vehicle speed curve initially starts at a flat constant value which, after the wheel is braked, commences deceleration during the preskid portion of the cycle. Accordingly, the capacitor 44 is charged to a voltage which is a function of the wheel velocity during this relatively flat portion of the preskid portion of the cycle. Upon deceleration of the wheel toward the critical slip point, the wheel velocity signal is less than the charge on capacitor 44 due to the slow discharge circuit of capacitor 44 to be described hereinafter. Accordingly, the discharge circuit of capacitor 44 will cause the voltage on the capacitor to follow a hypothetical straight line which hypothetically approximates the car velocity, in this case a one gravity deceleration. However, the wheel velocity is rapidly decreasing due to the brake force applied to the wheel.

This capacitor discharge circuit is seen to include a transistor 50 and a transistor 52. Also, a voltage divider circuit including a resistor 54 and a resistor 56 are included in the discharge circuit. Particularly, the current flows through the base-emitter circuit of transistor 50, the base-emitter circuit of transistor 52 and then to ground through the resistor 56, the base-emitter drops create a constant voltage across resistor 54. Accordingly, a voltage is fed to a voltage divider circuit, including resistors 60, 64 the resistors 60, 64 being chosen to provide a preselected percentage of the vehicle velocity signal to one input circuit of a differential amplifier system 66. It is to be noted that the velocity signal being fed to the one input circuit of the differential amplifier 66 is directed through two diode drops, including diode 42 and the base-emitter circuit of transistor 50. This signal is fed to the base circuit of transistor 68 of the differential amplifier 66. The use of a percentage vehicle velocity signal is optional and other systems may be utilized.

On the other hand, the wheel velocity signal is also fed to the other input terminal of the differential amplifier circuit 66, and particularly to the base circuit of a transistor 70 through a conductor 72 and diode 74. This voltage is developed across a resistor 76 which is connected between the base electrode of transistor 70 and ground. In this case, it is noted that the wheel velocity signal is directed through a single diode drop, particularly diode 74.

The differential amplifier circuit 66 if of the conventional type and includes an output circuit, in this case a current limiting resistor 80, and the two emitter electrodes of transistor 66 and 70 are connected to ground through resistor 82. When the vehicle velocity signal fed to transistor 68 is sufficiently above the wheel velocity signal, (in this case determined by the voltage divider resistor 60, 64 and the two diode drops across the diodes 42 and the transistor 50 in the case of the vehicle velocity signal, and the voltage drop of the diode 74 in the case of the wheel velocity signal), the transistor 68 will be non-conductive and the transistor 70 will be conductive. However, when the wheel velocity signal drops by a preselected amount below the decreasing ramp voltage, the transistor 68 will be rendered conductive and the transistor 70 will be rendered non-conductive. This differential operation creates a critical slip signal which is a function of the wheel velocity and the vehicle velocity ramp signals.

When this critical slip is reached, the output signal from the transistor 68 is fed to an inverter amplifier transistor 86, the emitter of which is connected to a positive 8.2-volt potential at terminal 88 and the collector of which is connected to ground through a resistor 90. This critical signal causes transistor 86 to conduct to provide an output signal to a second inverter transistor 94 through a resistor 96. The second transistor 94 is connected to a positive potential through a resistor 98 and ground potential at 100. The conduction of transistor 86 causes normally non-conductive transistor 94 to conduct, thereby grounding the output conductor 102 connected to the collector electrode of transistor 94.

The signal on conductor 102 is fed to the circuit 8 and particularly to a "nor" gate which has the characteristics that two positive signals to the input thereof will create a logical zero output signal and all other signal conditions will create a positive or logical one output signal, as for example, in the case of a zero input or both inputs being zero. This output signal from gate 106 is fed to an output node 108 connected to the input circuit of the control system 7 to be described hereinafter. The control circuit 7 is utilized to control the output duty cycle being fed to a triple mode force motor and valve assembly to be described in conjunction with FIGS. 2 to 4.

In the particular embodiment illustrated, the output signal is fed back to a disabling transistor 114 through a conductor 116. This positive signal will cause the normally non-conductive transistor 114 to conduct, thereby grounding conductor 118 through the collector-emitter circuit of transistor 114 and the resistor 120. This will rapidly discharge the capacitor 44 to disable the slip circuit. As will be seen from a further description of this system, the logic circuit, including gate 106, is designed to latch the output on until such time as certain conditions are sensed in the acceleration and rate of change of acceleration circuit 8. Thus, the disabling of the slip circuit will not affect the output signal being fed to the solenoid. It is to be understood that the disabling circuit, including conductor 116, transistor 114 and the resistor 120, may be eliminated in certain configurations of skid control systems. Further, the critical slip circuit 10 described above is presented purely for illustrative purposes and it is to be understood that other similar types of critical slip circuits may be utilized to generate the signal being fed to the gate 106.

Referring now to the circuit 8, the wheel velocity signal omega ($\omega$) impressed on conductor 18 is fed to a first derivative circuit 126 which provides derivative of the wheel velocity signal on output conductor 128. It is to be understood that the derivative circuit will be designed to provide the proper polarity of signals. The output from differentiator 126 is also fed to a second derivative circuit 130 to provide a rate of change of wheel acceleration signal on the output conductor 132. This latter signal is fed to an output "nor" gate 136 which is utilized to correlate the first and second derivatives of the wheel velocity signal, the first derivative signal being fed to the gate 136 by means of a conductor 140.

As stated above, the critical slip circuit 10 provides a logical zero input signal to the gate 106 to provide a logical one output signal from the gate 106 on conductor 110. This output signal is also fed to the input circuit of a third gate 144 by means of a conductor 146. Thus, gate 144 is responsive to the signals on conductor 146 and a conductor 148. The input signal to gate 136 from the derivative circuit as impressed on conductor 140 is positive when the rate of change of wheel acceleration signal is less than zero. On the other hand, the signal on conductor 140 is at a logical one level when the omega dot ($\dot{\omega}$) signal is greater than zero.

It is to be noted that the omega dot, or wheel acceleration signal, is negative or less than zero for the entire first half of the wave. On the other hand, the rate of change of acceleration signal or omega double dot ($\ddot{\omega}$) is negative during the first 90° of the wave form and is positive during the second 90° of the wave form. Accordingly, the signal on conductor 140 will be at a logical zero during the whole first half of the cycle and the signal on the conductor 132 will be at a logical zero and switch to a logical one.

The first derivative signal supplied by differentiator circuit 126 is normally zero and switches to a positive signal when the wheels accelerate. The signal on conductor 132 is normally at a logical zero and then switches to a positive level with a negative second derivative of the wheel velocity signal. Accordingly, during the preskid portion of the cycle, the first derivative signal on conductor 140 is a negative, the critical slip signal on conductor 102 is a positive level signal and the output from conductor 136 is a logical zero. During the skid portion of the cycle, the first derivative is a logical zero and the critical slip signal on conductor 102 is a logical zero. This renders the output on conductor 148 a logical one level and the output from gate 106 on conductor 110 at a logical one level. During the acceleration portion of the cycle, the first derivative is a logical one level signal and the second derivative is a logical zero level signal. This maintains the output of gate 136, on conductor 148, at a logical one level and the output from gate 106 at a logical one level. During the post inflection portion of the cycle, the first and second derivatives are a logical one level and the output of gate 136 on conductor 148 switches to a logical zero level, which renders the output from gate 106 at a logical zero level.

The output from the circuit 8 is fed to the output circuit 7 by means of conductors 150, 152 and 154. The signal level on conductor 150 is at a logical zero level during the preskid portion of the cycle, is at a logical one level during the skid and acceleration portions of the cycle and is at a logical zero level at the post inflection portion of the cycle. On the other hand, the signal on conductor 152 is at a logical zero level during the preskid and skid portions of the cycle, and thus until the start of the run-up of the wheels. The voltage then switches to a logical one level from the start of the run-up portion of the cycle to the top of the run-up portion. On the other hand, the signal on conductor 154 is at a logical one level during the preskid and acceleration portions of the cycle and switches to a logical zero level during the post inflection portion of the cycle.

Particularly, the signals on the conductors 152, 154 are fed to the input circuit of an "nor" gate 158, the output of which is inverted by means of an inverter circuit 160. The signal form on conductor 150 is fed to the input circuit of a second "nor" gate 162 by means of a conductor 164 and the "nor" gate 162 is also provided with the output of inverter circuit 160 by means of a conductor 166. The output of gate 162 is fed to one end of the solenoid coil 170 by means of a conductor 172, the signal on conductor 172 also being fed to the input circuit of a third "nor" gate 174. The gate 174 further includes an output from the gate 106, through conductor 150 and a conductor 176. The output of gate 174 is fed to the upper terminal of the coil 170 by means of a conductor 178.

In operation, and during the preskid mode portion of the cycle, the first derivative signal supplied to conductor 140 is at a logical zero level and the signal level on conductor 132 is at a logical one level due to the polarity characteristics selected for the derivative circuit 130. The slip signal on conductor 102 is at a logical one level during this portion of the cycle. Thus, the output from gate 136 is at a logical one level which renders the output on conductor 110 at a logical zero level. This is seen from the fact that, assuming the output at node 108 to be at a logical zero level, the input to gate 144 on conductor 146 is at a logical zero level. During this initial preskid portion of the cycle, the signal level on conductor 148 is at a logical one level to render the output from gate 144 at a logical one level due to the fact that the output signal from gate 106 on conductor 146 is at a logical zero level. This logical one is fed to gate 106 to be correlated with the slip signal which, during the initial preskid portion of the cycle is at a logical one level, to render the output at a logical zero level, the initial assumption.

Referring to gate 158, the signal level on conductor 148 during the preskid portion is at a logical one level and the first derivative signal on conductor 152 is at a logical zero level. Accordingly, the output from gate 158 will be at a logical one level which is inverted by the circuit 160 to provide a logical zero level at output conductor 166. During this initial portion, the signal on conductor 164 is at a logical zero level which is combined with the signal level on conductor 166 to provide a logical zero level to provide a logical one level at the output of conductor 172. This logical one level is fed to the input circuit of gate 174 to be correlated with the signal level on conductor 176. Both of these signals are at a logical zero level to produce a logical one level on output conductor 178. Thus, the signal at both the upper and lower end of the output coil 170 are at a logical one level to produce zero current flow through the coil 170. This defines the return mode of operation.

In the skid portion of the cycle, or the dump mode of operation, the first derivative on conductor 140 is at a logical zero level and the second derivative on conductor 132 is at a logical zero level. Accordingly, the output from gate 136 is at a logical one level and, assuming the output from gate 106 to be at a logical one level, the output from gate 144 will be at a logical zero level. This logical zero is fed to the input circuit of gate 106 to prove the logical one level assumed above.

The logical zero first derivative signal is fed to the input circuit of gate 158 along with the logical one level from the gate 136. These signal conditions produce a logical zero level signal at the input circuit to gate 162. This logical zero level is correlated with the logical one level on conductor 150 to produce a logical one level at the lower output terminal of the solenoid 170 connected to the conductor 172. This logical one level signal is also fed to the input circuit of gate 174 which is matched with the logical one level signal from the conductor 150 to produce a logical zero level signal at the upper output of solenoid 170. This produces a current flow down through the coil 170 in the dump mode of operation.

During the acceleration portion of the cycle or the hold mode, the first derivative is a logical one and a second derivative is a logical zero. These signal conditions produce a logical zero level at the upper input to gate 106 to produce a logical one level signal on conductor 150. The logical one output signal from gate 136 and the first derivative signal, also a logical one level signal, produces a logical one input signal to the gate 162. This is correlated with the logical one signal on conductor 150 to produce a logical zero level signal at the lower end of the solenoid 170. This logical zero level is also fed to the input circuit of gate 174 which produces a logical one level signal at the upper part of the solenoid 170. Thus, during the hold mode of operation, current flows in the opposite direction or up through the coil 170.

During the return mode of operation or the post inflection portion of the cycle, the logical zero level at the input to gate 144 produces a logical one level which is correlated with the logical one level critical slip signal to produce the logical zero level signal at output 150.

Also, the first derivative signal is fed to the input circuit to gate 158 which is correlated with the logical zero level at conductor 154. This produces a logical zero level signal at the input to gate 162 which is correlated with a logical zero level signal conductor 164 to produce a logical one level signal at the lower terminal to solenoid coil 170. This logical one level signal is also fed to the gate 174 with the logical zero level signal on conductor 176 to produce a logical one at the upper output terminal to solenoid 170. Thus, there is no current flow through the coil 170 during the return mode of operation.

The significance of these relative signal levels at each end of coil 170 will become apparent from a description of a preferred form of triple mode valve assembly to be described in conjunction with FIGS. 2–4. Referring now to FIGS. 2–4, there is illustrated a valve control assembly 210 which is utilized to control the application of fluid brake pressure to the wheel cylinders connected to a fluid output assembly 212, the pressure at the outlet port 212 being controlled by means of a hydraulic cylinder assembly 214. The input to the hydraulic cylinder assembly 214 is provided by means of a hydraulic line (not shown) connected to an inlet port 216 and a hydraulic piston assembly 220. The position of the piston assembly 220 is controlled by a diaphragm assembly 224, which, at its initial or rest balanced position, is provided with vacuum on either side of a diaphragm assembly 226. The vacuum or atmospheric pressure on the right side of the diaphragm assembly 226 is controlled by means of a control module 230, the control module 230 being in turn controlled by a force motor assembly 232.

In general, in the dump mode of operation, atmospheric pressure is supplied to the right side of the diaphragm assembly 226 to force the plunger assembly 220 to the left thereby closing the fluid passageway between inlet port 216 and outlet port 212. This removes brake pressure from the wheel cylinders to permit the wheels to spin-up. On the other hand, when it is desired to go into the hold mode of operation, appropriate valves are closed to trap the pressure in the right side of the diaphragm assembly to hold the plunger assembly 220 at the position reached when the hold mode of operation was signaled. Finally, in the return mode of operation, current is cut off to the force motor assembly 232 and the system achieves the position shown in FIGS. 2–4 to force the plunger 220 to the right to open the valving between the inlet port 216 and the output port 212 to return brake pressure to the wheel cylinders.

Referring specifically to the details of the hydraulic cylinder assembly 220, the assembly includes a piston element 240, the position of which is controlled by the diaphragm assembly through movement of a sleeve 242 as will be hereinafter explained. When the cup shaped housing 242 moves to the left, the piston 240 will also move to the left due to the hydraulic pressure being exerted at the inlet port 216. The right end 246 of the piston 240 supports a valving assembly which includes a main poppet valve 248 which is slidably supported within bore 250 by means of a washer element 252. The initial movement of the piston 240 to the left permits a shoulder element 254 on the pocket valve body 248 to engage a valve seat 256 to close off fluid flow around the valve body 248. Further movement of the piston element 240 permits a bleeder valve 260 to close over a port (not shown), the valve 260 being slidably supported by means of a stem 262 mounted within a bore of the main valve body 248. In addition to the hydraulic pressure, the valve elements 248 and 260 are biased to the left by means of spring elements 262, 264 which are seated at one end thereof against a plug element 266 supported within the bore 250.

In the position shown in FIG. 2, fluid flow will enter the port 216, flow through the bore of the plug element 266, through the valve assembly, including valve bodies 248, 260, through the bore 270 and through the outlet port 212 by means of a outlet port assembly 272. The piston 240 is supported in sliding relation to the main body 276 by means of a bearing element 278 which is fixedly supported within the housing of the diaphragm assembly 224. Suitable sealing washers 280, 282 are provided to seal the piston 240 in its sliding movement.

As was stated above, the initial movement of the piston 240 to the left moves the main valve body 248 to the left to seat the valve body against the valve seat 256. Upon further movement of the piston element 240, the second valve body 260 moves into engagement with the main valve body to completely shut off the hydraulic pressure to the wheel cylinders. Upon return of the piston 240 to the right, the opposite action occurs.

Referring to the specific details of the diaphragm assembly, the assembly includes a main diaphragm housing 284, the interior of which is connected to a source of vacuum (not shown) which generally is supplied by the engine vacuum system. The interior of the housing 284 is provided with a bell shaped support member 286 which is utilized to support one end of a spring 288, the other end of the spring being biased against the interior of a diaphragm element 290 by means of a second support element 292. The bell shaped member 286 includes, at its apex, an annular resilient washer element 294 which provides a stop for one direction of movement of the housing 242. The end of the housing 242 includes a washer element 298 which is adapted to position itself against the annular washer 294 when the housing element is initially assembled. The interior of the housing is connected to a vacuum source as described above and the other side of the diaphragm element is in fluid communication with a control chamber 300, the control chamber also being provided with vacuum through a pipe 302 connected at one end to the interior of the housing 284 and at the other end to the control chamber through a valving arrangement to be described hereinafter. Sufficient to say at this time that the vacuum is communicated to the control chamber through a valve assembly 306, a chamber 308 and a conduit 310 formed in the housing for the valve assembly 306. Thus, in the normal situation, with the valve assembly 306 open, both sides of the diaphragm assembly are connected to vacuum to provide a rest position for the diaphragm.

The top of the housing 284 is closed by means of an end bell assembly 310 which is bolted to the housing 284 by means of a plurality of fastener assemblies 314. The end bell assembly 310 also supports the plunger and valve assembly 240. For other details of this valve and diaphragm assembly, specific reference is made to the application of William Stelzer, Ser. No. 702,095, filed Jan. 31, 1968, now U.S. Pat. No. 3,495,882, issued Feb. 17, 1970 the specification of which is incorporated herein by reference.

Referring specifically to FIG. 4, the force motor assembly 232 is utilized to control the position of a second diaphragm assembly 320. Specifically, the diaphragm assembly 320 includes a diaphragm 322 and a pair of chambers 324, 326 positioned on either side of the diaphragm 322. The diaphragm 322 is positioned in its central location by means of a spring element 328 in the chamber 326 and a second spring 330 which acts against a shaft 332.

In the return mode of operation, zero current is flowing through a coil 336, the coil being utilized to move a cup shaped armature element 338 which is mounted in magnetic circuit with the coil 336. The armature 338 is rigidly mounted on a shaft element 340, the shaft element controlling the operation of a pair of valve assemblies 342, 344. Accordingly, in the return mode of operation, zero current flows through the coil 336 and armature 338 is in the position shown. In the dump mode of operation, current flows through the coil 336 such that the armature 338 is moved downwardly and the valve 344 is actuated as will be more fully explained hereinafter. In the hold mode of operation, the coil 336 is energized in the opposite polarity to move the armature element 338 upwardly to actuate the upper valve 342.

The interior chamber of the force motor assembly, defined by a housing 346, is supplied with vacuum from a vacuum port 348. The vacuum port 348 may be connected to any suitable source of vacuum, as for example, the vacuum source connected to the housing 248. In the normal standby or return mode of operation, the interior chamber defined by housing 346 is subject to vacuum. However, the poppet valves 344, 342 include a pair of valve elements 350, 352 which are adapted to seat against portions of the housing 354, 356 which form valve seats for the valve elements 350, 352. Thus, the vacuum from port 348 is confined to the interior chamber of the force motor in the return mode of operation.

During this return mode of operation, air is supplied to the chambers 324, 326 by means of apertures 360, 362 connected to the atmosphere through suitable filters 364, 366. The aperture 360 is connected to the chamber 324 by means of a passageway 368 and the aperture 362 is connected to the chamber 326 by means of a passageway 370. Accordingly, the diaphragm 322 will be at its mid-point position as illustrated in FIG. 4.

In the dump mode of operation, the armature 338 is moved downwardly because of the polarized energization of the coil 336. The downward movement of armature 338 closes the aperture 360 because of the seating of valve element 374 on the valve seat 376. This shuts off the flow of air to the passage 368 and thus to the chamber 324. On the other hand, the downward movement of the armature 338 opens the valve formed by valve element 352 and the valve seat 356 to introduce vacuum to the passageway 368 and thus the chamber 324. In this way, the chamber 324 is evacuated and a pressure differential is created across the diaphragm 322. It will be remembered that air is being supplied to the chamber 326. This causes the shaft 332 to move to the left. In the hold mode of operation, the opposite condition occurs wherein the shaft 340 is moved upwardly to close the air supply through passageway 362. Simultaneously, the vacuum source in the inner chamber of the force motor evacuates the chamber 326 by means of passageway 370 and the valve element 350. This causes the diaphragm element 322 to move to the right to cause shaft 332 to move to the right.

The shaft 322 is utilized to control two valves 380, 382. The valve 380 is directly connected to one end of the shaft 322 and includes a valving element 384 which is adapted to seat on a valve seat 386. The valve 380 controls the introduction of air into a chamber 388, the air being supplied from an exterior source, such as atmosphere, by means of a filter element 390. The valve assembly 382 is utilized to control the communication between chamber 388 and a second chamber 400 through a valve element 402 and a valve seat 404. The valve element 402 is biased downwardly and toward the valve seat 404 by means of a spring 406 which rests against an upper housing cap 408 and is nested within an annular housing portion 410 of the valve element 402. A diaphragm 412 is provided at the upper end of the valve element 402 and fluid passageway 414 is provided in a housing element 416 to communicate passage 388 with the upper passage 418 to balance the pressure across the valve element 402. The valve element also includes a stem 420 which is adapted to engage and be controlled by a raised portion 422 of shaft 322. The stem 420 is illustrated with a dotted flow passage which may be utilized in lieu of passage 414.

When the shaft 322 is moved to the left, the stem 420 will move to the right of the raised portion 422 and close the valve element 402 against the seat 404. On the other hand, when the stem 332 moves to the right, a similar action will occur and the valve stem 420 will move to the left of the raised portion 422. Thus, when the shaft 332 is moved to the right, the valve assembly 382 and the valve assembly 380 will both be closed. On the other hand, when the shaft 332 moves to the left, the valve assembly 380 will be open and the valve 382 will be closed. When the shaft 332 is in the position shown, the valve assembly 380 will be closed and the valve assembly 382 will be open.

Accordingly, in the return mode of operation, vacuum is supplied from the vacuum source through the pipe 302 through the open valve assembly 306, the passage 400, the conduit 310 to the control chamber 300. In this situation, the air source is shut off by means of a valve assembly 380. When the system goes into the dump mode of operation, the shaft 332 moves to the left to open the air source through the valve 380. This introduces air into the chamber 388, which air is fed to the control chamber 300 through the passage 310. In this condition, the valve 306 is closed to shut off the communication with the vacuum source at conduit 302.

In the hold mode of operation, the shaft 332 moves to the right to close valve assembly 306 and also closes the valve assembly 380. This traps the pressure in the control chamber 300 that was present at the time the hold mode of operation was started.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A skid control system for controlling the operation of a control valve assembly connected in controlling relationship with the hydraulic brake system of a wheeled vehicle, the valve assembly controlling the application of hydraulic force to the wheel brake, the improvement comprising the method of operating the control system in at least three modes of operation including the steps of sensing the wheel velocity, generating a critical slip signal in response to said sensed wheel velocity and initiating the dump mode of operation in response to said critical slip signal, deriving the first and second derivative of said wheel velocity, correlating said first and second derivatives of said wheel velocity, initiating the hold mode of operation in response to said correlated derivative signals, sensing a change in sign in said second derivative signal, and initiating said return mode of operation in response to said change in sign, said hold mode duration being determined substantially by said correlation of said first and second derivatives and said change in sign of said second derivative.

2. A skid control system for controlling the operation of a control valve assembly connected in controlling relation with the hydraulic system of a wheeled vehicle, the valve assembly controlling the application of hydraulic force to the wheel brake, the improvement comprising means for sensing a critical slip signal, means for sensing the wheel velocity, means connected to said wheel velocity sensing means for deriving the first and second derivatives of said wheel velocity, means connected to respond to said derivative deriving means for correlating said first and second derivatives, means for sensing a change in sign in said second derivative signal, said control system having at least three modes of operation and including an output coil, said system generating a first signal at said coil for dumping the pressure from the wheel in response to sensing said critical slip signal, means connected to said change in sign sensing means for generating a second signal for returning pressure to the wheel in response to said change in sign sensing means, and means for generating a third signal in response to said correlating means for holding pressure at the wheel during at least a portion of the acceleration portion of the wheel cycle, said correlating means initiating the hold mode of operation, and means connected to said second signal sensing means for initiating said return mode of operation in response to the sensed change of sign of said second derivative signal, said hold mode duration being determined substantially by said correlating means and said change in sign of said second derivative signal.

3. The improvement of claim 2 wherein said critical slip sensing means includes means for deriving a hypothetical vehicle velocity signal and means for comparing said vehicle velocity signal with said wheel velocity signal.

4. The improvement of claim 3 wherein said critical slip signal occurs when said wheel velocity signal drops a preselected amount below said hypothetical vehicle velocity signal.

5. The improvement of claim 4 wherein said vehicle velocity signal is a linearly decreasing ramp.

6. A skid control system for controlling the operation of a control valve assembly connected in controlling relation with the hydraulic brake system of a wheeled vehicle, the valve assembly controlling the application of hydraulic force to the wheel brake, the improvement comprising the control system having at least three modes of operation and including an output coil, a critical slip signal generating means for generating a signal in response to a preselected slip, and a differentiating circuit including a wheel speed sensor for generating a first signal which is the first derivative of the wheel speed and a second signal which is the second derivative of the wheel speed, said system generating a first signal at said coil for dumping the pressure from the wheel, a second signal for returning pressure from the wheel and a third signal for holding pressure at the wheel during at least a portion of the acceleration portion of the wheel cycle, said critical slip signal generating means operating to generate said critical slip signal during the run-down portion of the wheel, said control system further including logic means for correlating said first, second and critical slip signals to generate an output signal having a first polarity in response to sensing said critical slip signal, a second polarity output signal in response to a change in first derivative and a zero signal in response to sensing a change in sign of said second derivative signal.

7. The improvement of claim 6 including third logic gate means for correlating the output of said first logic gate means and said first derivative signal.

8. The improvement of claim 7 further including an output logic circuit, said output logic circuit including first and second output gates, said first and second output gates generating output signals across said output coil.

9. The improvement of claim 8 wherein said first output logic gate includes an input signal from said second and third logic gates, said first output gate being connected to one end of said output coil.

10. The improvement of claim 9 wherein said second output logic gate includes an input from said first output logic gate and said second logic gate means, said second output logic gate being connected to the opposite end of said output coil.

11. The improvement of claim 10 wherein, during said dump mode of operation, said first output gate provides an output signal of a first polarity and said second output gate provides an output signal of a second polarity opposite to said first polarity.

12. The improvement of claim 11 wherein the outputs of said first and second output gates are reversed in polarity for said hold mode of operation.

13. The improvement of claim 12 wherein the outputs of said first and second output gates are equal for said return mode of operation.

* * * * *